(No Model.)
G. W. CISCO & J. J. CISCO, Jr.
KETTLE.
No. 524,191.  Patented Aug. 7, 1894.
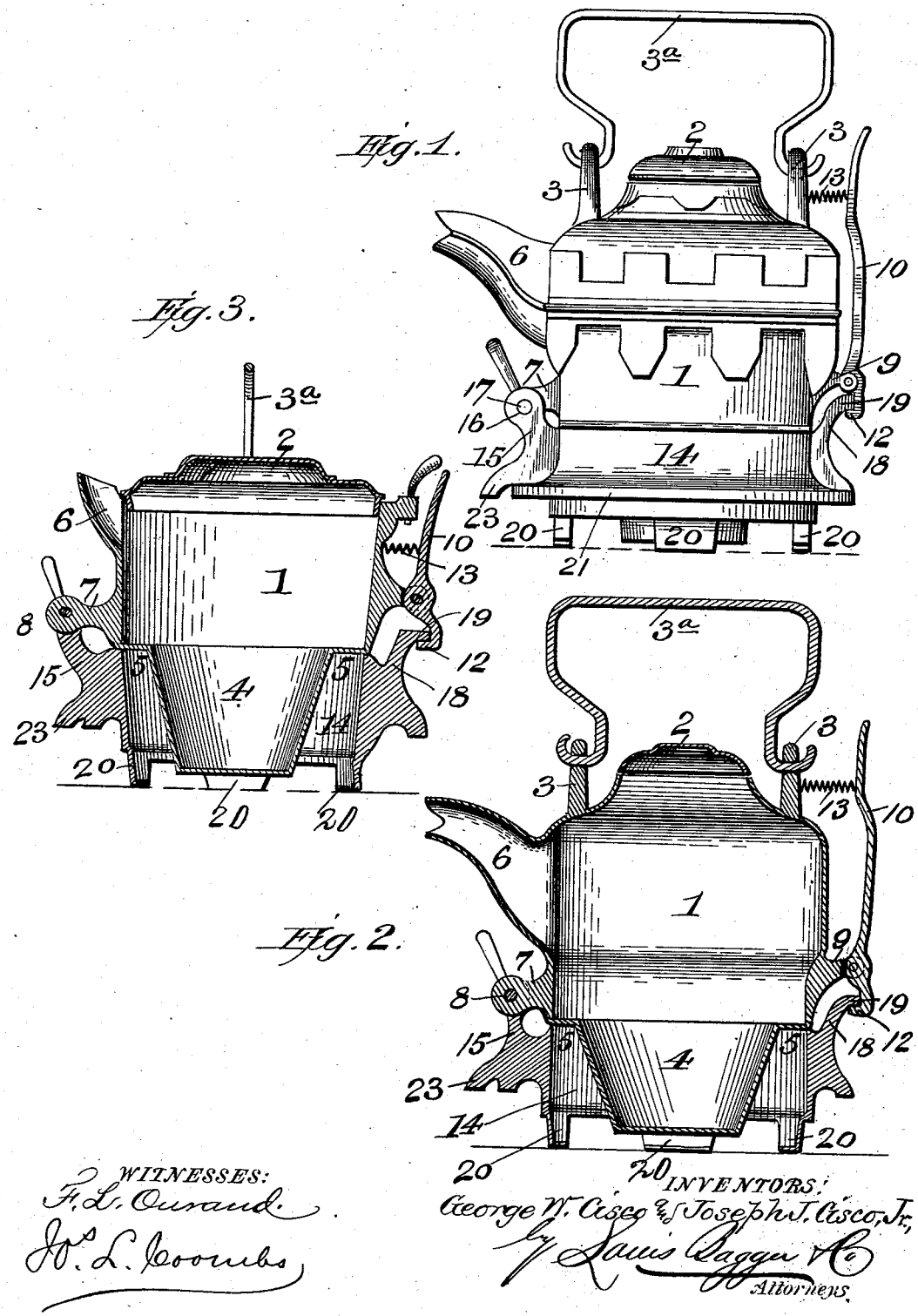
WITNESSES:
F. L. Ourand
W. L. Coombs
INVENTORS:
George W. Cisco & Joseph J. Cisco, Jr.
by Louis Bagger & Co.
Attorneys
THE NORRIS PETERS CO., PHOTO-LITHO., WASHINGTON, D. C.

UNITED STATES PATENT OFFICE.

GEORGE W. CISCO AND JOSEPH JAY CISCO, JR., OF NEW YORK, N. Y.

KETTLE.

SPECIFICATION forming part of Letters Patent No. 524,191, dated August 7, 1894.

Application filed April 30, 1894. Serial No. 509,541. (No model.)

*To all whom it may concern:*

Be it known that we, GEORGE W. CISCO and JOSEPH JAY CISCO, Jr., both residents of New York, in the county of New York and State of New York, have invented certain new and useful Improvements in Kettles; and we do hereby declare that the following is a full, clear, and exact description of the invention, which will enable others skilled in the art to which it appertains to make and use the same, reference being had to the accompanying drawings, which form a part of this specification.

Our invention relates to heating kettles for culinary or other domestic purposes, and its object is to provide an improved vessel of this character, which shall be durable in construction, and economical and convenient, and otherwise efficient in use.

The invention consists in the novel construction and combination of parts, hereinafter fully described and claimed.

In the accompanying drawings: Figure 1 is a side elevation of a kettle, constructed in accordance with our invention. Fig. 2 is a central longitudinal section of the same. Fig. 3 is a similar view, showing a slightly modified construction in the shape of the kettle.

In the said drawings, the reference numeral 1 designates the kettle made of cast or sheet metal or other material, provided with the usual cover 2, and lugs 3 on its upper end to which is pivoted the handle or bail 3ª. The lower end of the kettle is provided with a contracted tapering downward extension or well 4 forming a shoulder 5. At or near its upper end the kettle is provided with a spout 6. Below and aligned with the said spout the kettle is formed with an outwardly extending lug 7, having an aperture 8 therein, and diametrically opposite the same is formed with an outwardly extending lug 9, in which is pivoted a lever 10, the lower end of which is bent or turned inwardly, at an angle forming a hook 12. To the upper end of this lever is connected one end of a coiled spring 13, the other end of which is connected with one of the lugs 3.

The numeral 14 designates a base ring upon which the kettle is supported. At its upper edge, on one side, it is formed with lugs 15, which embrace the lug 7, and is formed with apertures 16, aligned with the aperture 8 in said lug 7, through which passes a removable pivot pin 17, thus forming a hinge for the kettle. Opposite the lugs 15 is a lug 18 having its end bent outwardly forming a catch 19, with which the hook 12, of lever 10 engages. At its lower end the base ring is formed with a series of downwardly depending fingers 20, which project into the stove hole when placed on a stove, and which serve as supports or legs therefor, when placed on a table or other object. The base above said fingers is formed with an annular flange 21, which rests upon the rim or edge of the stove hole and supports the base on the stove. The lugs 15 are formed with a downward extension or toe 23, which rests upon the stove and serves to prevent the base ring from tipping over when the kettle is tilted.

The operation will be readily understood: The base ring is placed on the top of a stove with the fingers projecting down into the hole therein. By forcing the upper end of the lever 10 inwardly, its hook 12 will be disengaged from the catch 19, allowing the kettle to be tilted, the toe 23 bearing against the stove and preventing the base ring from tipping. When the kettle is returned to normal the lever is actuated by its coiled spring to again engage the hook 12 with catch 19, securely locking the kettle to the base so that the latter and the base ring can be lifted together from the stove and transported from place to place without liability of turning on the hinge.

By removing the pivot pin 17, the kettle can be disconnected from the base.

From the above it will be seen that we provide a tilting kettle which will be very convenient in use, as it can be readily tilted to pour out the contents, and owing to the construction of the lower part or well and the base ring, the water or other fluid contained therein, can be readily heated, thus effecting a saving in the consumption of fuel.

Having thus fully described our invention, what we claim is—

1. The combination with a kettle having a downwardly depending extension or well and formed with an apertured lug and a spring-actuated hooked lever, of the base ring having downwardly extending fingers, the apertured lugs, the removable pivot pin passing therethrough and through the aperture in the lug of the kettle, the diametrically opposite catch with which said lever engages and the annular flanges adapted to rest on the top of a stove, substantially as described.

2. The combination with a kettle having a downwardly depending extension or well and formed with an apertured lug and provided with a spring actuated hooked lever, of the base ring having downwardly extending fingers, the apertured lugs, the removable pivot pin passing therethrough and through the aperture in the lug of the kettle, the diametrically opposite catch, the annular flange and the toe adapted to bear against the top of the stove and prevent the base ring from tipping, substantially as and for the purpose specified.

In testimony that we claim the foregoing as our own we have hereunto affixed our signatures in presence of two witnesses.

GEORGE W. CISCO.
JOSEPH JAY CISCO, JR.

Witnesses:
JOSEPH J. CISCO, SR.,
HARRY I. TUTTLE.